W. R. McGAWEN.
SIDE DELIVERY RAKE.
APPLICATION FILED OCT. 19, 1904.
908,601.
Patented Jan. 5, 1909.
3 SHEETS—SHEET 1.
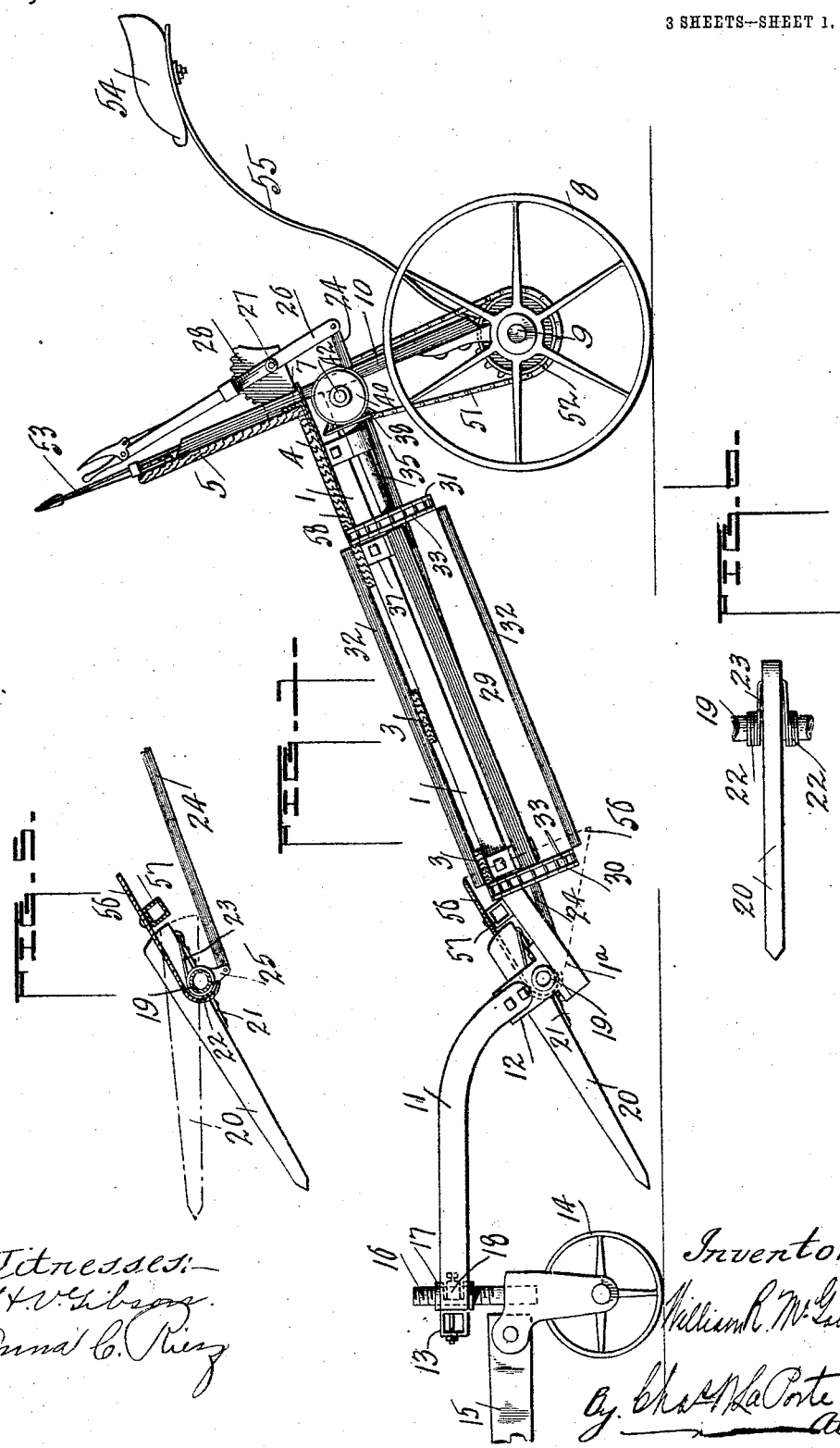

W. R. McGAWEN.
SIDE DELIVERY RAKE.
APPLICATION FILED OCT. 19, 1904.
908,601.
Patented Jan. 5, 1909.
3 SHEETS—SHEET 2.
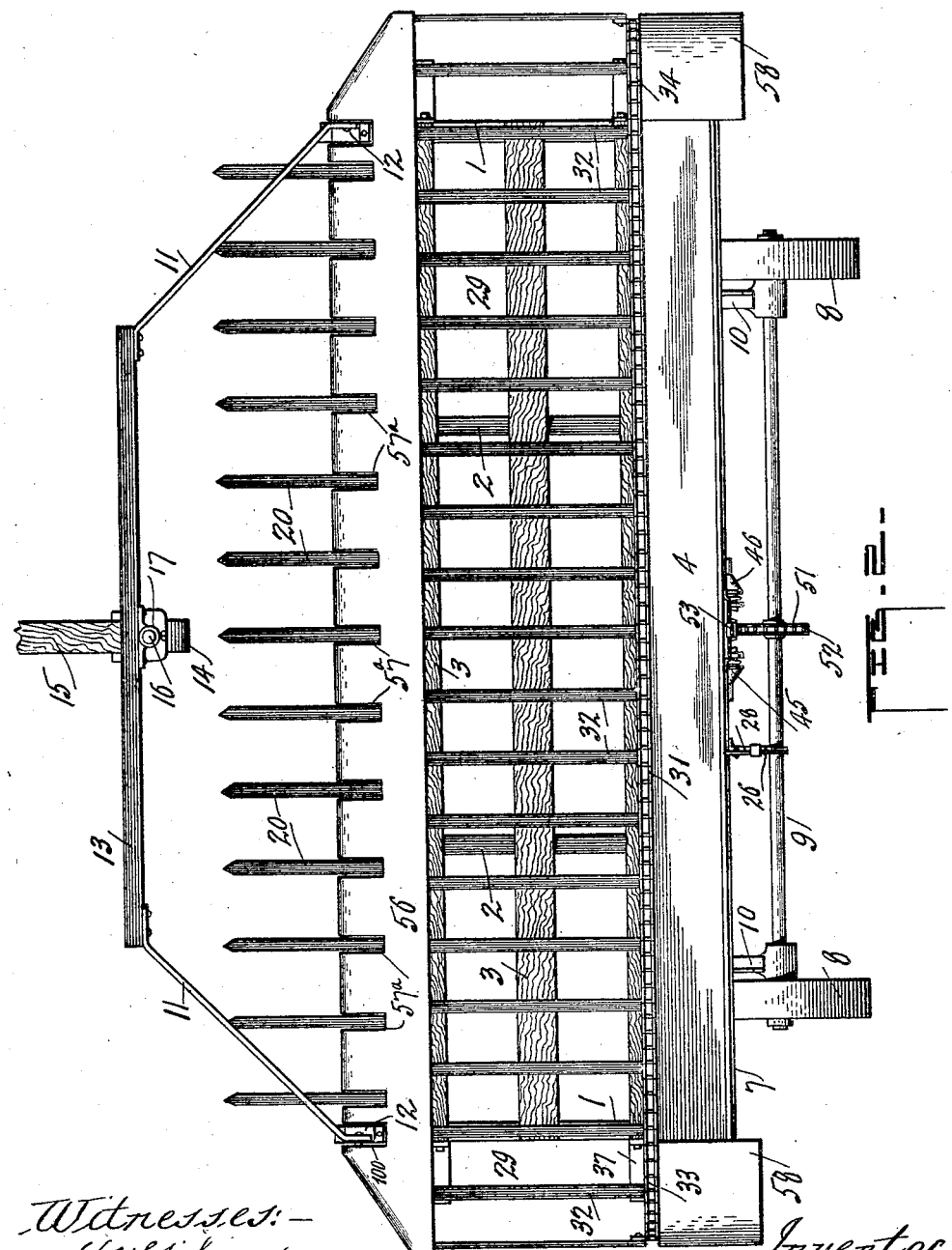

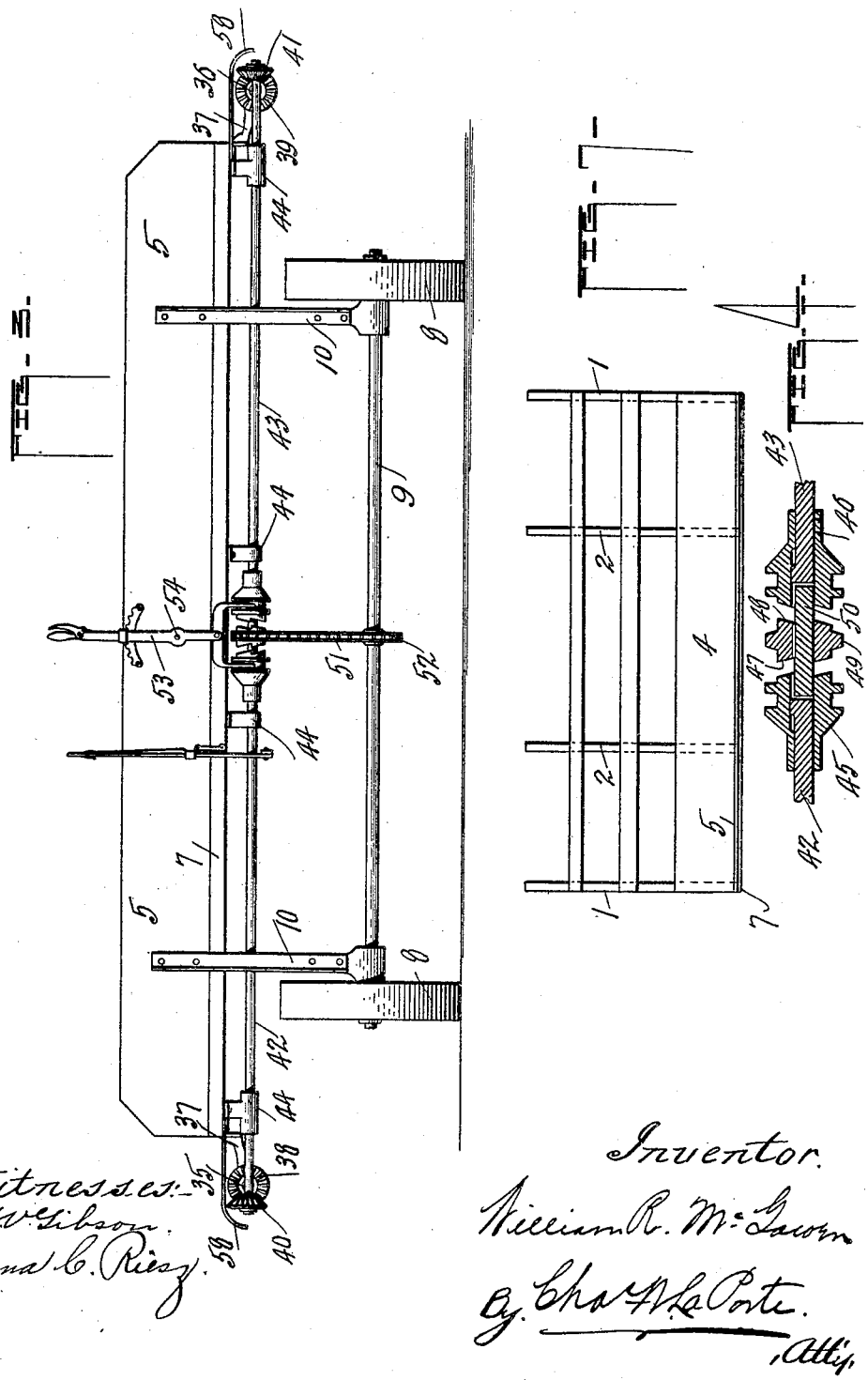

UNITED STATES PATENT OFFICE.

WILLIAM R. McGAWEN, OF KNOXVILLE, ILLINOIS, ASSIGNOR OF ONE-HALF TO JAMES S. FIELD, OF PEORIA, ILLINOIS.

SIDE-DELIVERY RAKE.

No. 908,601.      Specification of Letters Patent.      Patented Jan. 5, 1909.

Application filed October 19, 1904. Serial No. 229,104.

*To all whom it may concern:*

Be it known that I, WILLIAM R. McGAWEN, a citizen of the United States, residing at Knoxville, in the county of Knox and State of Illinois, have invented certain new and useful Improvements in Side-Delivery Rakes; and I do hereby declare that the following is a full, clear, and exact description of the invention, which will enable others skilled in the art to which it appertains to make and use the same.

This invention has reference to certain new and useful improvements in side-delivery hay rakes, a reversing clean sweep rake adapted for wind-rowing and bunching.

The invention has for its object a rake adapted to gather the mowed hay from the swath and deliver it in a continuous windrow at either end of the machine; also to gather either the swath or wind-row and deliver the same in bunches at either end of the machine.

A further object of the invention is a gathering device consisting of a series of teeth mounted on a revoluble support whereby the forward ends of the teeth may be simultaneously raised or lowered; the manner of supporting the teeth being such that they may, each, automatically adjust themselves to the inequalities of the ground. Of a transverse movable and reversible carrier supported at the head of and in close proximity to the gathering teeth, the same adapted to receive the hay gathered by the teeth and deliver the same to one side or the other of the machine. The gathering teeth and carrier being supported in the same general incline. Means being provided to reverse the carrier at will, or raise or lower the gathering teeth, also adjust the angle of the entire frame and thereby the pitch of the teeth.

The invention is illustrated in the accompanying drawings, wherein:—

Figure 1 is a side elevation of my improved side delivery rake, parts thereof broken away to show the detail arrangement of certain parts; Fig. 2 is a plan view of the machine; Fig. 3 is a rear elevation of the machine; Fig. 4 is an enlarged detail in section of driving and reversing mechanism for the said carrier; Fig. 5 is an elevation of one of the gathering teeth, its support and the spring connection between tooth and support, which adapts the teeth to adjust themselves independently of each other; Fig. 6 is a plan of the tooth seen in Fig. 5, and Fig. 7 is a greatly reduced plan view of a skeleton frame support for the carrier and the teeth aforesaid.

Like numerals of reference indicate corresponding parts throughout the figures.

The support for the working parts of the rake comprises a main frame consisting of the angle iron sills 1 and 2, the former the end sills and latter the intermediate sills; they support or have secured thereto the frame parts 3 and 4 which form a platform for a suitable carrier or conveyer to be described. To the frame 4 is secured a backing frame 5, extending up from the frame 4 and of approximately the same length, the two frames being secured to an angle iron frame or sill 7. The support for the rear portion of the frame, such as described, is upon two ground wheels 8 carried by an axle 9, to which is suitably secured supports 10 which at their upper ends are attached to the frame 5.

The forward portion of the main frame is supported in a somewhat lower position than the rear thereof, thereby giving a downward pitch to the devices attached thereto; the support comprising a pair of arms or bars 11, secured at their inner ends to brackets 12 attached to forwardly inclined portions 1$^a$, of the sills 1. The said arms extend forward and inward and are secured to a cross-sill or frame 13, which in turn is supported by a caster-wheel 14 to the bearing of which is attached the pole 15. The connection between the frame 13 and the caster-wheel is by means of a threaded stem or spindle 16 passing through a slotted bracket 17 secured to the frame 13, to have a swivel connection therein, and 18 denotes a threaded collar or nut adjustable on the stem 16 and disposed within the slotted portion of the bracket 17; to facilitate, when the position of the collar 18 is adjusted on the stem 16 the angle of the main frame is correspondingly adjusted, as also any devices supported thereby, the axle 9 forming the fulcrum on which the main frame is swung, the purposes of which will be hereinafter more particularly pointed out.

19 indicates a tubular shaft or stem extending across the sills 1 and 2 of the main frame, its outer ends journaled in the brackets 12 secured to the sills 1, and in suitable bearings on the sills 2, not shown. And upon this tubular shaft is pivotally attached at intervals gathering teeth 20 preferably wooden, which extend across the shaft 19 and tapered toward their outer ends. The teeth are supported on the shaft through the half-boxings 21.

The arrangement of the main frame is such, that the inner portion thereof is supported somewhat above the axle 9 and the ground wheels 8, the forward portion thereof extending forwardly and downwardly, with the forward extensions of the sills 1 and 2 being slightly more inclined than the remaining portions of the sills, giving more of a slope to the extensions than to the remainder of the frame, as seen in Fig. 1. With this arrangement of the sills and frame the teeth 20 slope downwardly with their forward tapered ends touching the ground or not as may be desired; so that any material gathered by the teeth in the forward movement of the rake will be elevated thereon and deposited on a carrier to be described.

At the pivotal point of the teeth with the tubular shaft 19, a spring connection is made, which allows the teeth to act independent of each other and to adapt themselves to the inequalities of the ground. This is accomplished through coils 22 of a spring 23, the coils wound around the shaft 19 upon opposite sides of the teeth, with the opposite ends of the coils attached to the shaft, the main portion of the spring 23 secured to the body of the tooth, preferably by the boxings 21 as shown.

The means of rocking or partially rotating the tubular shaft 19 for the purpose of more or less depressing the forward end of the teeth 20, or to raise them from the ground, as seen in dotted lines in Fig. 5, is through a bar 24 connected at its forward end to a strap 25 secured to the shaft 19, and its opposite or inner end attached to the lower end of a lever 26 fulcrumed at 27 to a segment rack 28 secured to the frame 5. The lever being operated and controlled similar to levers of this type.

The carrier or conveyer to which reference has been made, is indicated as 29, being of the usual construction of a chain and slat carrier. The chains denoted as 30 and 31 to which are secured the slats 32. The chains 30 and 31 travel around and are adapted to be driven by sprocket wheels 33 and 34 carried by driven shafts 35 and 36. The chain 30 travels in its upper run on the frame 3, while the chain 31 travels along the frame 4. The shafts 35 and 36 are journaled in boxings or bearings 37 supported from or attached to the sills 1, carrying on their inner ends the bevel pinions 38 and 39 which intermesh respectively with bevel pinions 40 and 41 on the outer ends of corresponding shafts 42 and 43 journaled in brackets 44 supported by the frame 4.

On the inner end of the shafts 42 and 43 is carried the slip-key clutches or clutch sections 45 and 46, which are adapted to be alternately locked with the clutch faces 47 and 48 of a driven sprocket wheel 49 carried by a short intermediate shaft 50, the opposite ends of which are loosely carried in the clutch sections 45 and 46 which forms a bearing for the ends of the said intermediate shaft. The sprocket wheel 49 is driven through a sprocket chain 51 having connection with a driving sprocket wheel 52 on the axle 9.

The means for shifting the clutch sections 45 and 46, consists of a lever 53, fulcrumed at 54 to the frame 5, with bifurcated end portions which engage with the clutch sections 45 and 46; the said lever having the usual detent and rack connections for locking the position of the lever when adjusted. The shifting of the lever in either direction will cause one or the other of the sections 45 or 46 to engage and lock with the clutch faces of the sprocket wheel 49 and thereby impart power through one or the other of the shafts 42 or 43, to the carrier 29, through the shaft 35 or 36 and the gears described.

In the drawings the sections 45 and 46 are both disengaged from the clutch faces of the sprocket 49, when the carrier will remain stationary, but the intermediate shaft 50 may be continuously rotated, if the machine is moving forward, and to impart motion to the carrier in either direction it is necessary to shift the lever 53 in the direction desired when motion will be imparted to the said carrier through the gearing described. It being understood that the direction of the movement of the carrier is governed by the shafts 42 and 43 and the gearing at the outer ends thereof which is in operative connection with said carrier.

The lever 53 for regulating the direction of travel of the carrier and the power which is imparted thereto, is placed on the rear of the frame 5 within easy reach of an operator who may stop or reverse the carrier at will; this is also true of the lever 26 which is also within easy reach of an operator that he may raise or depress the gathering teeth 20 when necessary or desirable.

There is an operator's seat 54 secured to a support 55 suitably supported from the axle 9 of the machine, the seat being seen in Fig. 1 and omitted in Figs. 2 and 3. The carrier is also omitted in Fig. 3. There is provided a shield 56 of suitable material which covers the forward portion of the main frame, the chain 30 and a portion of the carrier slats, as also the shaft 19 and the coils 22 between the gathering teeth. A sill or frame part 57 is provided supported by the sills 1 and 2, to this is secured the body of the shield 56 which extends back and over the chain and slats as specified and as seen in Figs. 1 and 2. The forward portion of the shield overlies the shaft 19 and coils 22, with portions extending down and around the said shaft and coils, the body of the shield cut away at points 57ª to adapt the carrying of the gathering teeth 20 and to enable the teeth to oscillate with the movement of the shaft to raise or lower the said teeth. The opposite end portions of the shield cover a portion of the extensions 1ª of the sills 1, also the forward sprocket wheels 33 and 34, and are cut away as at 100 to allow for the brackets 12 which pass up through said cut-out portions 100, as shown in Fig. 1. It will be seen therefore, that, when the machine is in operation the gathering teeth will slide under the hay and lift the same from the ground, and as the hay accumulates on the teeth it will be forced back upon the carrier, when it will be conveyed by the carrier to either end of the machine and deliver it in a continuous windrow.
It will be understood from the description, and the drawings, that the carrier may be stopped during the movement of the machine and allow the hay to accumulate on the carrier, when the carrier may again be put in motion and deliver the accumulated hay at either end of the machine; the carrier may again be stopped and the same operation of bunching repeated at the will of the operator. The gathering teeth are designed and adapted to carry the hay over the lower edge of the shield, when the hay will be left free for the carrier, the said carrier in its movement assisting in drawing the hay from the teeth.
My machine is adapted to gather two five-foot swaths at a time and deliver the same at either side in a continuous windrow or a row of bunches of any desired size. By reason of the reversible feature, the rake can be always driven in the direction of the travel of the mower, and the row is finished from both sides leaving the windrow loose and clean. By delivering first to the right and in the finishing round to the left, the hay is left in a loose windrow on ground previously raked and which has become heated and dry from the action of the sun and wind, thus curing the hay at the same time it is raked.

Particular attention is called to my method of gathering the hay. The feature of the gathering teeth lies in the fact that they pick up positively no dirt or trash from the meadow bottom, the reason for which is, the teeth travel, raised above the surface of the ground as seen in Fig. 1, the teeth sliding under the hay as above stated and lifting it from the swath just as it fell from the mower. This peculiar action of the gatherer insures the curing of the hay evenly, regularly and without either tearing it to pieces or burning it. The usual kicking and thrashing is altogether avoided, and the hay is picked up free from dirt and trash and turned gently over in a loose windrow so that the air can pass through and cure it.

Having thus fully described my invention, what I claim and desire to secure by Letters Patent of the United States, is:—

1. In a machine of the character described, the combination with a supporting frame disposed in a sloping position, a cross-carrier mounted on said frame, mechanism for driving the carrier including a means for reversing the direction thereof, and a series of gathering teeth suitably supported by the frame and extending in a sloping position from a point in proximity to the carrier to a point in proximity to the ground, substantially as specified.

2. In a machine of the character described, the combination with a portable frame, a cross-carrier mounted thereon, mechanism for driving the carrier, means for reversing the driving mechanism, gathering means for delivering hay to the carrier, comprising a series of inclined teeth, and means for raising or depressing the teeth, in manner and for the purposes specified.

3. In a machine of the character described, the combination of a supporting frame, a cross-carrier, mechanism for driving the carrier including a means for reversing the direction thereof, a series of gathering teeth for delivering hay to the carrier, their inner ends disposed in close proximity thereto, and a shield disposed between the inner end of the teeth and overlying a portion of the carrier, and the said shield provided with portions extending between the teeth, all substantially as specified.

4. In a machine of the character described, the combination of a supporting frame, a cross-carrier, means for driving the carrier and means for reversing the direction thereof, a shaft supported in advance of the carrier, a series of gathering teeth for delivering hay to the carrier suitably supported by the said shaft, and spring connections between the shaft and teeth, whereby the teeth may independently adjust themselves to the inequalities of the ground, substantially as specified.

5. In a machine of the character described, the combination of a cross-carrier, a series of gathering teeth, a support for the teeth upon which the same have an independent oscillatory motion, means for raising the said teeth in unison, mechanism for driving the carrier including a means for reversing the direction thereof, and means whereby the reversing of the carrier may be operated at will, for the purpose of depositing hay upon the ground in a continuous windrow at either end of the machine, or to deposit the same in bunches at desired intervals, substantially as specified.

6. In a machine of the character described, the combination of a cross-carrier, a series of gathering teeth for gathering hay from the ground and delivering it to the carrier, a suitable support for the said teeth, a yielding connection between support and teeth whereby the said teeth may independently adjust themselves to the inequalities of the ground, means for raising or lowering the forward end of the teeth and retain them in such raised or lowered positions, mechanism for driving the carrier including a means for reversing the direction thereof, and means for adjusting the support for the gathering teeth and thereby regulate the pitch of the teeth and carrier support, substantially as specified.

7. In a machine of the character described, the combination of a cross-carrier, mechanism for driving the carrier including means for reversing the direction thereof, a series of gathering teeth adapted to deliver hay to the carrier, the said teeth adapted to automatically adjust themselves to the irregularities of the ground, means for adjusting the angles at which the said teeth may be carried, and a shield extending from the inner end of the teeth to the carrier with portions thereof lying between the teeth, substantially as specified.

8. In a machine of the character described, the combination with a reversible carrier, a longitudinally disposed shaft, a series of teeth supported by the shaft, boxings supporting the teeth to oscillate upon or with the said shaft, and springs having portions coiled about and secured to the shaft and a portion secured to the said teeth, substantially as specified.

In testimony whereof I affix my signature, in presence of two witnesses.

WILLIAM R. McGAWEN.

Witnesses:
   J. S. FIELD,
   ROBERT N. McCORMICK.

It is hereby certified that the name of the patentee in Letters Patent No. 908,601, granted January 5, 1909, for an improvement in "Side-Delivery Rakes," was erroneously written and printed "William R. McGawen," whereas said name should have been written and printed *William R. McGowen;* and that the said Letters Patent should be read with this correction therein that the same may conform to the record of the case in the Patent Office.

Signed and sealed this 26th day of January, A. D., 1909.

[SEAL.]

C. C. BILLINGS,
*Acting Commissioner of Patents.*